US012749305B2

(12) United States Patent
Shibata et al.

(10) Patent No.: US 12,749,305 B2
(45) Date of Patent: Sep. 29, 2026

(54) INFORMATION DISPLAY APPARATUS, INFORMATION DISPLAY METHOD, AND COMPUTER-READABLE RECORDING MEDIUM

(71) Applicant: NEC Corporation, Tokyo (JP)

(72) Inventors: Takashi Shibata, Tokyo (JP); Naoya Sogi, Tokyo (JP); Kenta Senzaki, Tokyo (JP); Makoto Terao, Tokyo (JP); Masahiro Tani, Tokyo (JP); Hiroyoshi Miyano, Tokyo (JP)

(73) Assignee: NEC CORPORATION, Tokyo (JP)

( * ) Notice: Subject to any disclaimer, the term of this patent is extended or adjusted under 35 U.S.C. 154(b) by 105 days.

(21) Appl. No.: 18/805,667

(22) Filed: Aug. 15, 2024

(65) Prior Publication Data

US 2025/0069303 A1 Feb. 27, 2025

(30) Foreign Application Priority Data

Aug. 23, 2023 (JP) ................................ 2023-135826

(51) Int. Cl.

*G06T 11/60* (2026.01)
*G06F 16/29* (2019.01)
*G06T 7/70* (2017.01)
*G06V 20/17* (2022.01)

(52) U.S. Cl.

CPC .............. *G06T 11/60* (2013.01); *G06F 16/29* (2019.01); *G06T 7/70* (2017.01); *G06V 20/17* (2022.01)

(58) Field of Classification Search

None

See application file for complete search history.

(56) References Cited

U.S. PATENT DOCUMENTS

2015/0046194 A1* 2/2015 Waddell ................ G06Q 40/04 705/4
2023/0194304 A1* 6/2023 Russo .................... H04W 4/44

OTHER PUBLICATIONS

He, K., Zhang, X., Ren, S., & Sun, J. (2016). Deep residual learning for image recognition. In Proceedings of the IEEE conference on computer vision and pattern recognition (pp. 770-778).

* cited by examiner

*Primary Examiner* — Frank S Chen
(74) *Attorney, Agent, or Firm* — Sughrue Mion, PLLC

(57) ABSTRACT

An information display apparatus includes: a collation unit that specifies a position of an object in an overhead image obtained by capturing an image of a region that includes the object before a disaster, based on a result of collating the overhead image with a section in a target image that includes a situation of the object after the disaster, the section satisfying a criterion for determining that an influence of the disaster is small; and a display unit that displays an image that includes the situation of the object and information by which the position of the object in the overhead image can be specified.

18 Claims, 11 Drawing Sheets

INFORMATION DISPLAY APPARATUS, INFORMATION DISPLAY METHOD, AND COMPUTER-READABLE RECORDING MEDIUM

CROSS-REFERENCE TO RELATED APPLICATIONS

This application is based upon and claims the benefit of priority from Japanese patent application No. 2023-135826, filed on Augst 23, 2023, the disclosure of which is incorporated herein in its entirety by reference.

BACKGROUND OF THE INVENTION

1. Field of the Invention

The present disclosure relates to a display apparatus and a display method for displaying information indicating a disaster situation and the like, and further relates to a computer-readable recording medium in which a program for realizing the display apparatus and the display method is recorded.

2. Background Art

In order to prevent damage from spreading when a large-scale natural disaster such as an earthquake, flooding, or volcanic eruption occurs, there is a need to make an appropriate initial response based on quick ascertainment of the disaster/damage situation. In particular, on the occurrence of a natural disaster such as a typhoon, excessive rainfall, or an earthquake, which has become more and more serious recently, it is important to promptly ascertain damaged locations, areas, and the situation of damage in order to quickly make initial responses such as evacuation guidance and rescue operations for those affected by the disaster.

Heretofore, information that is available immediately after the occurrence of a disaster is limited to global information (seismic intensity distribution, electricity failure situation, precipitation situation, etc.) that is obtained from meteorological agencies and public-sector organizations, and it is only possible for those affected by the disaster and the like to roughly ascertain the magnitude of damage. In order to ascertain a more detailed damage situation, a person who is to make an initial response (hereinafter, referred to as a "user") is required to perform on-site investigation, which takes time. In view of this, consideration has been given to providing, to the user, a large number of disaster site images showing a disaster situation, the disaster site images having been captured and collected at the time of a disaster, such that the user can efficiently ascertain the damage situation.

In order to efficiently ascertain a damage situation in detail, it is necessary to select images that are useful for ascertaining a damage situation in detail from a large number of disaster site images such as those described above, and organize the selected images. For this purpose, there is a method for selecting/organizing useful images by classifying a large number of disaster site images into specific classes (building, vehicle, road, and the like) defined in advance. An image classifying method for classifying images into specific classes defined in advance is disclosed in, for example, He, K., Zhang, X., Ren, S., & Sun, J. (2016). Deep residual learning for image recognition. In Proceedings of the IEEE conference on computer vision and pattern recognition (pp. 770-778).

However, in the image classifying method disclosed in the above non-patent document, images are merely classified based on a subject. For this reason, when a disaster occurs, it is difficult to quickly specify and ascertain a disaster situation and locations by only using the image classifying method.

SUMMARY OF THE INVENTION

An example object of the present disclosure is to solve the aforementioned problem, and to make it possible to quickly ascertain and specify a disaster situation.

In order to achieve the above-described object, an information display apparatus includes:

a collation unit that specifies a position of an object in an overhead image obtained by capturing an image of a region that includes the object before a disaster, based on a result of collating the overhead image with a section in a target image that includes a situation of the object after the disaster, the section satisfying a criterion for determining that an influence of the disaster is small; and a display unit that displays an image that includes the situation of the object and information by which the position of the object in the overhead image can be specified.

In order to achieve the above-described object, an information display method includes:

a collation step of specifying a position of an object in an overhead image obtained by capturing an image of a region that includes the object before a disaster, based on a result of collating the overhead image with a section in a target image that includes a situation of the object after the disaster, the section satisfying a criterion for determining that an influence of the disaster is small; and a display step of displaying an image that includes the situation of the object and information by which the position of the object in the overhead image can be specified.

In order to achieve the above-described object, a computer readable recording medium according to an example aspect of the invention is a computer readable recording medium that includes recorded thereon a program, the program including instructions that cause the computer to carry out:

a collation step of specifying a position of an object in an overhead image obtained by capturing an image of a region that includes the object before a disaster, based on a result of collating the overhead image with a section in a target image that includes a situation of the object after the disaster, the section satisfying a criterion for determining that an influence of the disaster is small; and a display step of displaying an image that includes the situation of the object and information by which the position of the object in the overhead image can be specified.

As described above, according to the invention, it is possible to quickly ascertain and specify a disaster situation.

EXAMPLE EMBODIMENT

In the example embodiment, examples of an information display apparatus, an information display method, and a program will be described below with reference to FIGS. 1 to 11.

[Apparatus Configuration]

Figure 1:
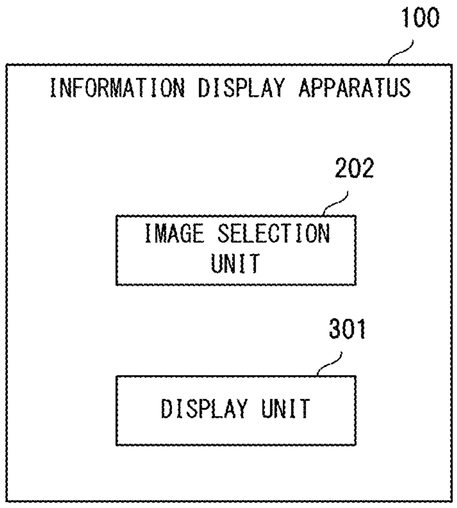
FIG. 1 is a configuration diagram illustrating an exemplary schematic configuration of the information display apparatus.

First, an exemplary schematic configuration of the information display apparatus will be described with reference to FIG. 1. FIG. 1 is a configuration diagram illustrating an exemplary schematic configuration of the information display apparatus.

An information display apparatus 100 shown in FIG. 1 is an apparatus for presenting information indicating a disaster situation and the like. As shown in FIG. 1, the information display apparatus 100 includes a collation unit 202 and a display unit 301.

The collation unit 202 specifies the position of an object in an overhead image obtained by capturing an image of a region that includes the object before a disaster, based on a result of collating the overhead image with a section in a target image that includes the situation of the object after the disaster, the section satisfying a criterion for determining that the influence of the disaster is small. The display unit 301 displays an image that includes the situation of the object and information by which the position of the object in the overhead image can be specified.

As described above, the information display apparatus 100 can display, on an image, information by which the situation and the position of an object in a disaster-stricken region can be specified. For this reason, the information display apparatus 100 makes it possible to quickly ascertain and specify a disaster situation.

Figure 2:
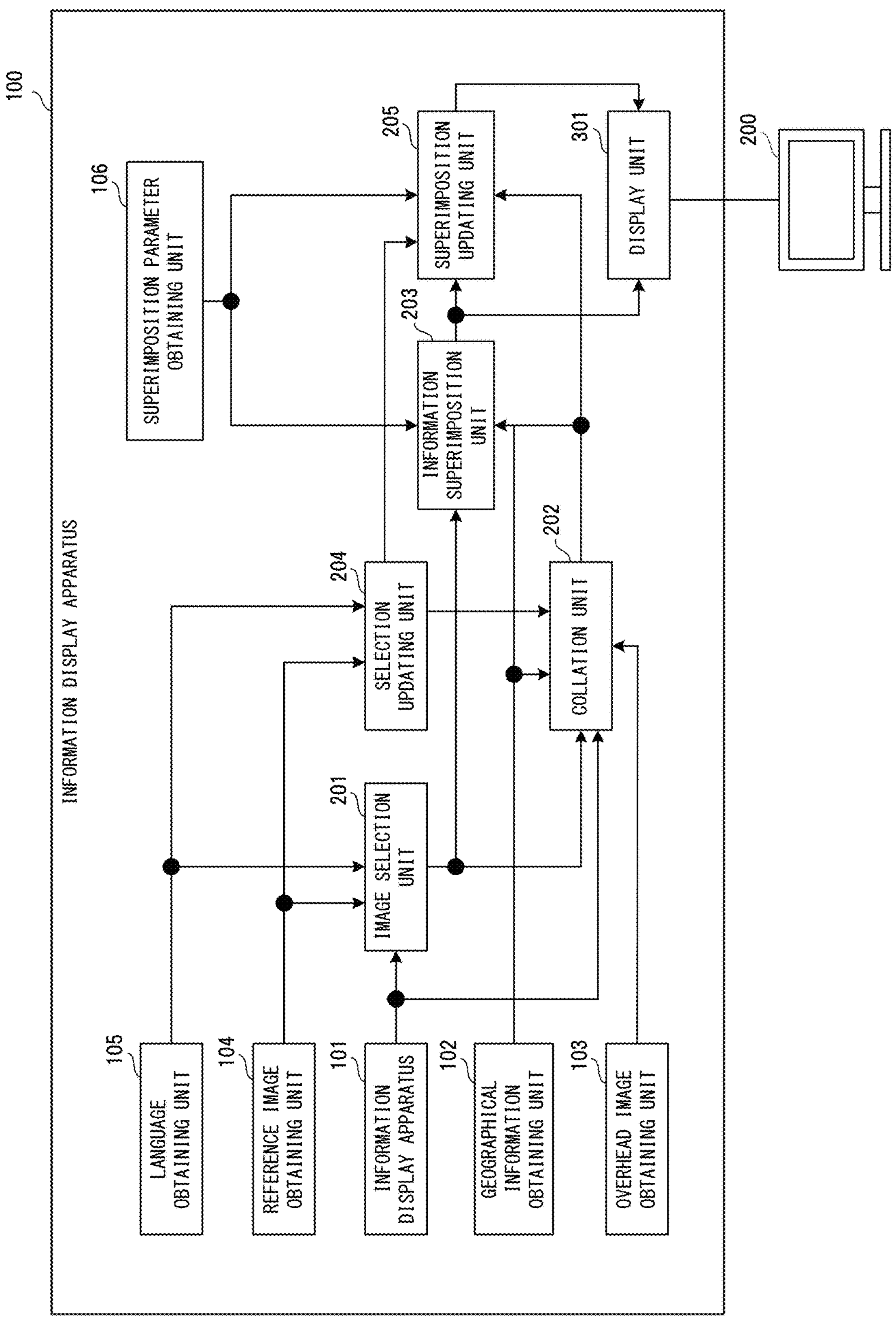
FIG. 2 is a configuration diagram specifically illustrating the configuration of the information display apparatus shown in FIG. 1.

Next, a configuration and functions of the information display apparatus 100 will be described in detail with reference to FIGS. 2 to 9. FIG. 2 is a configuration diagram specifically illustrating the configuration of the information display apparatus shown in FIG. 1.

As shown in FIG. 2, the information display apparatus 100 includes an image obtaining unit 101, a geographical information obtaining unit 102, an overhead image obtaining unit 103, a reference image obtaining unit 104, a language obtaining unit 105, and a superimposition parameter obtaining unit 106 in addition to the collation unit 202 and the display unit 301, which have been described above.

In addition, the information display apparatus 100 also includes an image selection unit 201, an information superimposition unit 203, a selection updating unit 204, and a superimposition updating unit 205. In addition, as shown in FIG. 2, the information display apparatus 100 is connected to a display device 200. The units of the information display apparatus 100 will be described below.

Image Obtaining Unit 101

The image obtaining unit 101 obtains one or more images as a group of images. Examples of the group of images in this specification include a moving image captured in a continuous manner by a video camera and a row of still images captured at a certain time interval. Examples of such images also include images collected from an SNS. Furthermore, examples of the images also include images captured by a street camera, a camera mounted on a flying object such as a drone, a surveillance camera, an on-vehicle camera, and a drive recorder. The image 10) obtaining unit 101 may obtain an image obtained by shooting a landscape.

In addition, the image obtaining unit 101 can also obtain an image other than a visible image, such as an image obtained from a sensor other than a camera. Specifically, examples of the image other than a visible image include a temperature image and a depth image. In addition, the image may be a processing result obtained while deep learning is being performed. In this case, the image obtaining unit 101 obtains a multi-channel image.

Furthermore, the image obtaining unit 101 can also obtain a numerical value such as a measurement value in addition to the above images. Examples of the numerical value include vector data calculated through numerical value simulation (a velocity field, a density field, etc.). Images and numerical values obtained by the image obtaining unit 101 are recorded in a storage device such as a memory (not illustrated).

In addition, images that are obtained by the image obtaining unit 101 do not need to be captured by a single camera. The image obtaining unit 101 can also obtain a multi-modal image, such as an image that includes a visible image and a far-infrared image captured by two cameras, namely a visible light camera and an infrared camera. In that case, positions in these images may be matched using the method disclosed in Reference Document 1 below, or the like. In addition, these images may be combined to obtain one image using the method disclosed in Reference Document 2 below, or the like.

(Reference Document 1) Shibata, Takashi, Masayuki Tanaka, and Masatoshi Okutomi. "Accurate Joint Geometric Camera Calibration of Visible and Far-Infrared Cameras." Electronic Imaging 2017.11 (2017): 7-13.

(Reference Document 2) Shibata, Takashi, Masayuki Tanaka, and Masatoshi Okutomi. "Unified Image Fusion Framework with Learning-Based Application-Adaptive Importance Measure." IEEE Transactions on Computational Imaging 5.1 (2018): 82-96.

Each image is an image illustrating the situation of an object (hereinafter, referred to as a "target image"). The object is an object that has a structure of a building, a bridge, a house, a school, a hospital, a government building, another building, a traffic light, a road, a sidewalk, a pavement-mark, a curbstone, a guardrail, an electricity pole, a steel tower, or the like. The image may be an image before a disaster or an image after a disaster, for example. The image includes the situation of an object after a disaster, for example. Aside from this, the image may also include information indicating an object that has not been damaged from a disaster (not affected by the disaster) or an object slightly damaged from the disaster (the degree of damage is lower). In addition, the image may be an image that includes a single object that includes a section that has been slightly damaged (or has not been damaged, or has been slightly affected or has not been affected by the disaster) and a destroyed section. The object that has not been damaged from a disaster (or not affected by the disaster) may be a natural thing such as a mountain, a river, the ocean, or a forest.

Examples of a disaster include at least one of natural disasters and man-caused disasters. Examples of a disaster include heavy rainfall, excessive rainfall, a typhoon, an earthquake, tsunami, flooding, a tidal wave, heavy snow, a tornado, volcanic eruption, a landslide, land subsidence, inundation, submergence, a fire, a wildfire, an explosion, and destruction.

Geographical Information Obtaining Unit 102

The geographical information obtaining unit 102 obtains geographical information configured by superimposing information on a two-dimensional plane or three-dimensional space. Examples of the geographical information configured by superimposing information on a two-dimensional plane or three-dimensional space in this specification includes a map. In addition, examples of the geographical information configured by superimposing information on three-dimensional space include map data generated through Building Information Modeling, Computer Aided Design, and the like. Note that, in the example embodiment, the geographical information is not limited to those listed above. Other examples of the geographical information include three-dimensional point cloud data constructed out of a large number of two-dimensional images using a three-dimensional restoration technique such as SfM (Structure from Motion). The geographical information obtaining unit 102 then records obtained geographical information in a memory (not illustrated) or the like.

Overhead Image Obtaining Unit 103

The overhead image obtaining unit 103 obtains at least one image obtained by shooting a target region from above, as an overhead image. Examples of the at least one image captured from above include an air photo and a satellite image. In addition, the overhead image may be an image captured by an uninhabited airborne vehicle such as a drone from above. Furthermore, the overhead image is not limited to a still image, and, for example, may be a moving image captured by a video camera mounted on an airplane or an uninhabited airborne vehicle, or may also be a row of still images captured at a certain time interval. In addition, the overhead image obtaining unit 103 records the obtained overhead image in a memory (not illustrated) or the like.

In addition, when collated with a target image by the collation unit 202 to be described later, an overhead image is used as a base image (hereinafter, referred to as a "reference image"). Examples of the reference image include a captured image of a region that includes an object before a disaster and a captured image of a region that includes an object after a disaster.

Reference Image Obtaining Unit 104

The reference image obtaining unit 104 obtains at least one reference image to be used for selecting or updating a group of images from among the group of images obtained by the image obtaining unit 101. Note that a group of images is selected by the image selection unit 201 to be described later, and a group of images is updated by the selection updating unit 204 to be described later.

Language Obtaining Unit 105

The language obtaining unit 105 obtains reference language information for specifying at least one language used for selecting or updating a group of images from among the group of images obtained by the image obtaining unit 101. Note that, also in this case, a group of images is selected by the image selection unit 201 to be described later, and a group of images is updated by the selection updating unit 204 to be described later.

The reference language information may be information that includes words or sentences that serve as a key for selecting or updating a group of images. The reference language information is input by the user through an external device. Specifically, the reference language information may include a message indicating a specific region, such as " city" or "search for an image of  city". Furthermore, the reference language information may include words or sentences indicating a key for selecting or updating a group of images, such as "search for a region that includes a collapsed building", "collapse", or "collapsed building". In addition, the reference language information may also include words or sentences indicating an order in which images that have already been selected are to be specified, such as "images 1 and 4 are target images", "images 3, 6, and 7 are not target images", or "image 1".

Superimposition Parameter Obtaining Unit 106

The superimposition parameter obtaining unit 106 obtains a superimposition parameter required for later-described processing for superimposing characters on an image. Determination of at least one of an intensity, an attribute, an area, characters, and the like for performing superimposition is performed using the superimposition parameter, for example. Note that superimposing processing is performed by the information superimposition unit 203 to be described later and the superimposition updating unit 205 to be described later.

Specifically, for example, a superimposition parameter is set in accordance with the level of importance (specifically, the magnitude of damage or the like) calculated through an image recognition technique, a text recognition technique (more specifically, an image captioning technique), or the like, for each image. The higher this level of importance is, the higher the values the intensity, the area, and the like for performing superimposition are set to. In addition, for example, the superimposition parameter may be an attribute of an image calculated through image recognition, or may also be characters (text information) calculated through text recognition (more specifically, an image captioning technique). The superimposition parameter obtaining unit 106 records the obtained superimposition parameter in a memory (not illustrated) or the like.

Image Selection Unit 201

Figure 3:
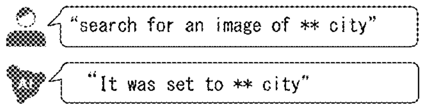
FIG. 3 is a diagram illustrating an example of a screen displayed by the information display apparatus.
Figure 3:
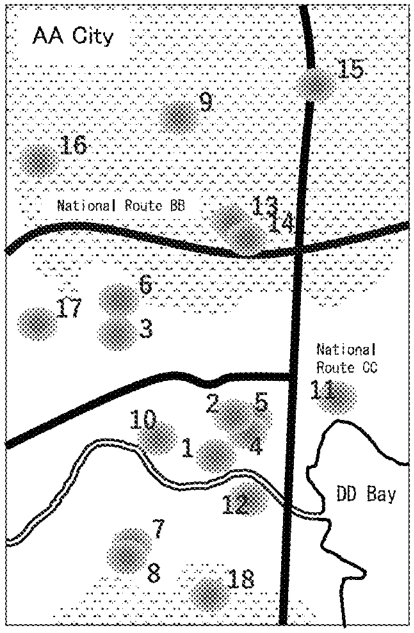
Figure 4:
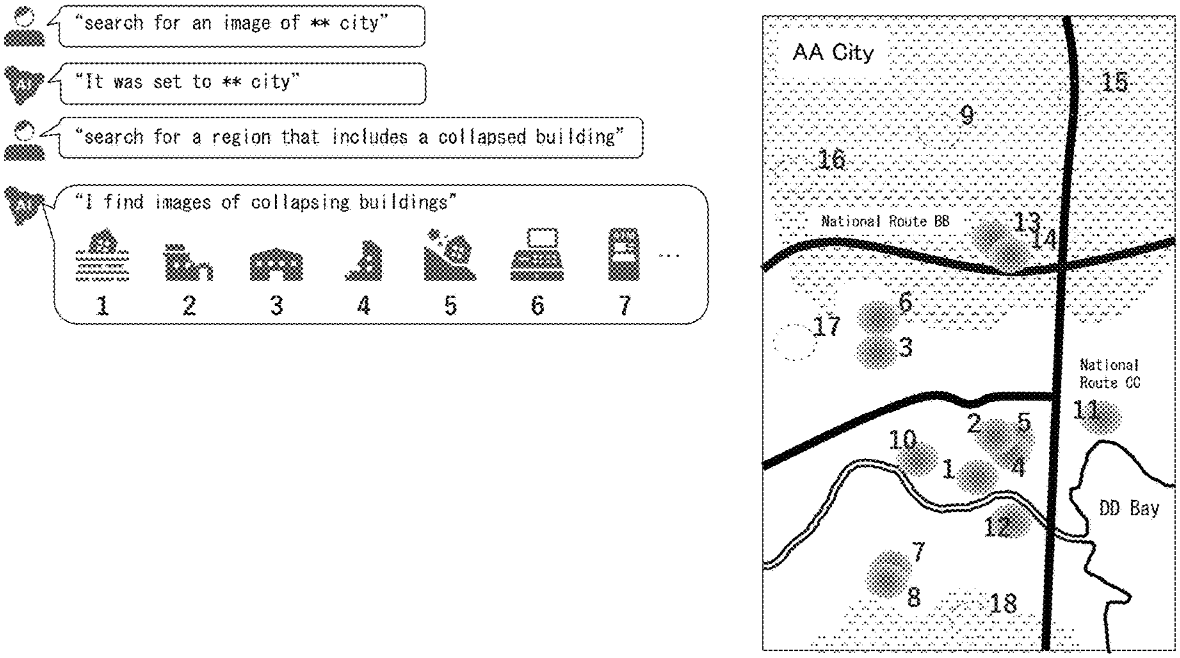
FIG. 4 is a diagram illustrating an example of a screen displayed by the information display apparatus.
Figure 5:
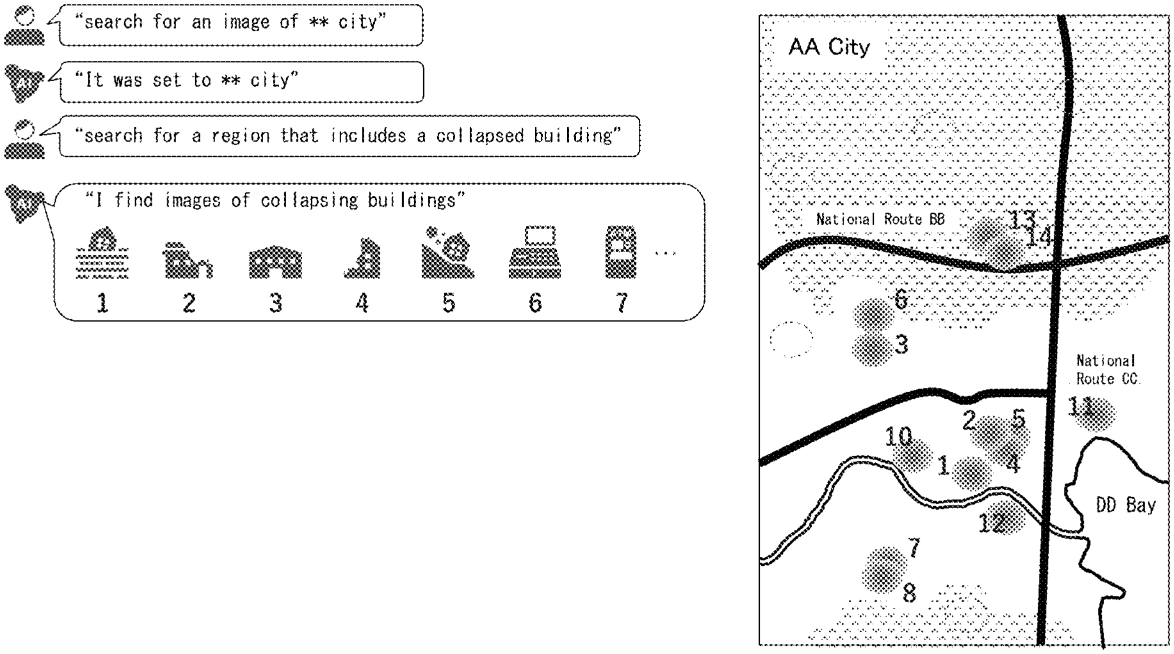
FIG. 5 is a diagram illustrating an example of a screen displayed by the information display apparatus.

The image selection unit 201 selects one or more images from the group of images obtained by the image obtaining unit 101, based on at least one of reference language information and a group of reference images, and sets the selected images as a group of selected images. Specifically, as shown in FIGS. 3 to 5, the image selection unit 201 selects images related to the reference language information obtained by the language obtaining unit 105, from the group of images obtained by the image obtaining unit 101, in accordance with an instruction from the user. In addition, the image selection unit 201 selects, from the group of images obtained by the image obtaining unit 101, one or more images whose features are similar to those of the group of reference images obtained by the reference image obtaining unit 104.

In addition, the image selection unit 201 can also select, from the group of reference images, one or more images that include an image related to a language included in a reference image and/or an image having a feature similar to that of the group of reference images, using the method disclosed in JP 2023-027897A, for example.

Collation Unit 202

The collation unit 202 collates at least one image of the group of images obtained by the image obtaining unit 101 with the above geographical space information and overhead image, and calculates a correspondence relationship between spatial positions in the geographical space information and the at least one image. The collation unit 202 then calculates spatial coordinates in the at least one image based on the correspondence relationship, and outputs the calculated spatial coordinates as correspondence spatial coordinates.

Specifically, the collation unit 202 sets, as a target, at least one image from among the images that belong to the group of selected images selected by the image selection unit 201 from the group of images obtained by the image obtaining unit 101. The collation unit 202 collates the image set as a target (hereinafter, referred to as a "target image") with the geographical space information and overhead image, calculates a correspondence relationship between spatial positions in the geographical space information and the target image, and further calculates spatial coordinates in the target image using this correspondence relationship. In addition, the collation unit 202 can also calculate a correspondence relationship between spatial positions in the geographical space information and the target image using the method disclosed in JP 2002-032013A, for example.

The collation unit 202 can also perform processing for collating the target image and a reference image with each other, and specifying the position of an object in the target image using the collation result. Assume that, for example, the target image is an image that includes the situation of an object after a disaster, and the reference image is an image that includes a region that includes the object before the disaster. In this case, the collation unit 202 collates a section in the target image that satisfies a criterion for determining that there is no influence from the disaster (or a section that satisfies a criterion for determining that there is slight influence from the disaster) with the reference image.

Note that the criterion for determining that there is slight influence from the disaster may be there being a manmade construction product such as a building, a bridge, or a hospital after the disaster, there being a natural thing such as a mountain or a river, or the like.

The collation unit 202 specifies the position of the object in the reference image based on a section determined as matching (resembling) the reference image as a result of collation. When both the target image and the reference image are images before the disaster, or both the target image and the reference image are images after the disaster, the collation unit 202 may specify a section in the reference image that matches (or resembles) the object as the position of the object.

Information Superimposition Unit 203

The information superimposition unit 203 executes superimposition display on a portion of each image of the group of selected images selected by the image selection unit 201, the portion corresponding to the correspondence space coordinates output by the collation unit 202, using the geographical space information obtained by the geographical information obtaining unit 102. The information superimposition unit 203 then outputs the image subjected to this superimposition display as superimposition geographical space information.

In addition, the information superimposition unit 203 can also superimpose an intensity, an attribute, an area, characters, and the like for performing superimposition on each image using superimposition parameters that were obtained by the superimposition parameter obtaining unit 106 and correspond to the image, in addition to the geographical space information.

Specifically, as shown in FIGS. 3 to 9, the information superimposition unit 203 generates a concentric pattern indicating the intensity and the area of superimposition, using superimposition parameters that were obtained by the superimposition parameter obtaining unit 106 and correspond to each image. The information superimposition unit 203 then superimposes the generated pattern on the geographical space information. In addition, the information superimposition unit 203 can also generate a pattern of any shape such as a triangle or a quadrangle instead of a concentric pattern. Furthermore, the information superimposition unit 203 can also generate a pattern for displaying a probability distribution such as Gaussian distribution using contour lines or pseudo colors, and superimpose the generated pattern on the geographical space information.

Furthermore, the information superimposition unit 203 can also superimpose an attribute and characters on the geographical space information using superimposition parameters that were obtained by the superimposition parameter obtaining unit 106 and correspond to each image. More specifically, when "collapsed building" that falls under "attribute" and "prompt rescue work is required" that falls under "characters" are obtained as superimposition parameters, the information superimposition unit 203 directly superimposes the attribute and characters on the geographical space information (see FIGS. 6 to 9). 20

Selection Updating Unit 204

The selection updating unit 204 re-selects images from the group of selected images selected by the image selection unit 201, based on at least one of a reference image and the reference language information in accordance with an instruction from the user, and outputs the re-selected images as a group of re-selected images.

Specifically, for example, the selection updating unit 204 re-selects one or more images having an image feature that is similar to that of an image indicated by language information, from the group of selected images selected by the image selection unit 201. In addition, the selection updating unit 204 can also re-select one or more images having an image feature that is similar to that of the group of reference images, from the group of selected images selected by the image selection unit 201. More specifically, the selection updating unit 204 can also re-select one or more images from the group of selected images using the above-described method disclosed in JP 2023-027897A, for example.

Superimposition Updating Unit 205

The superimposition updating unit 205 performs superimposition display, again, on each image of the group of re-selected images output by the selection updating unit 204 using the superimposition geographical space information output by the information superimposition unit 203. Furthermore, the superimposition updating unit 205 also performs different re-superimposition display on images that were not selected as the group of re-selected images, and outputs these images, namely re-superimposition results, as re-superimposition geographical space information.

Furthermore, the superimposition updating unit 205 also superimposes an intensity, an attribute, an area, characters, and the like for performing superimposition on each of the images of the group of re-selected images, using a superimposition parameter obtained by the superimposition parameter obtaining unit 106 and corresponding to the image, in addition to the superimposition geographical space information, thereby updating the image.

Specifically, as shown in FIGS. 3 to 9, the superimposition updating unit 205 generates a concentric pattern indicating an intensity and an area of superimposition, using superimposition parameters obtained by the superimposition parameter obtaining unit 106 and corresponding to each image. The superimposition updating unit 205 then superimposes the generated pattern on the geographical space information, thereby updating the image. In addition, the superimposition updating unit 205 can also generate a pattern of any shape such as a triangle or a quadrangle instead of a concentric pattern. Furthermore, the superimposition updating unit 205 can also generate a pattern for displaying a probability distribution such as Gaussian distribution using contour lines or pseudo colors, and superimpose the generated pattern on the geographical space information, thereby updating the geographical space information.

Furthermore, the superimposition updating unit 205 can also superimpose an attribute and characters on the geographical space information using superimposition parameters that were obtained by the superimposition parameter obtaining unit 106 and correspond to each image. Specifically, when "collapsed building" that falls under "attribute" and "prompt rescue work is required" that falls under "characters" are obtained as superimposition parameters, the superimposition updating unit 205 directly superimposes the attribute and characters on the geographical space information, thereby updating the image.

Display Unit 301

As shown in FIG. 3, the display unit 301 displays, on a screen, the superimposition geographical space information output by the information superimposition unit 203 or the re-superimposition geographical space information output by the superimposition updating unit 205. In addition, as shown in FIGS. 4 to 9, the display unit 301 can also display information obtained by the image obtaining unit 101, the geographical information obtaining unit 102, the overhead image obtaining unit 103, the reference image obtaining unit 104, and the language obtaining unit 105, in addition to the superimposition geographical space information or the re-superimposition geographical space information, in accordance with an instruction from the user.

Specifically, for example, as shown in FIGS. 6 to 9, the display unit 301 displays reference language information input by the user, such as "search for an image of  city", "search for a region that includes a collapsed building", "images 1 and 4 are target images", and "images 3, 6, and 7 are not target images" obtained by the language obtaining unit 105**.

Figure 7:
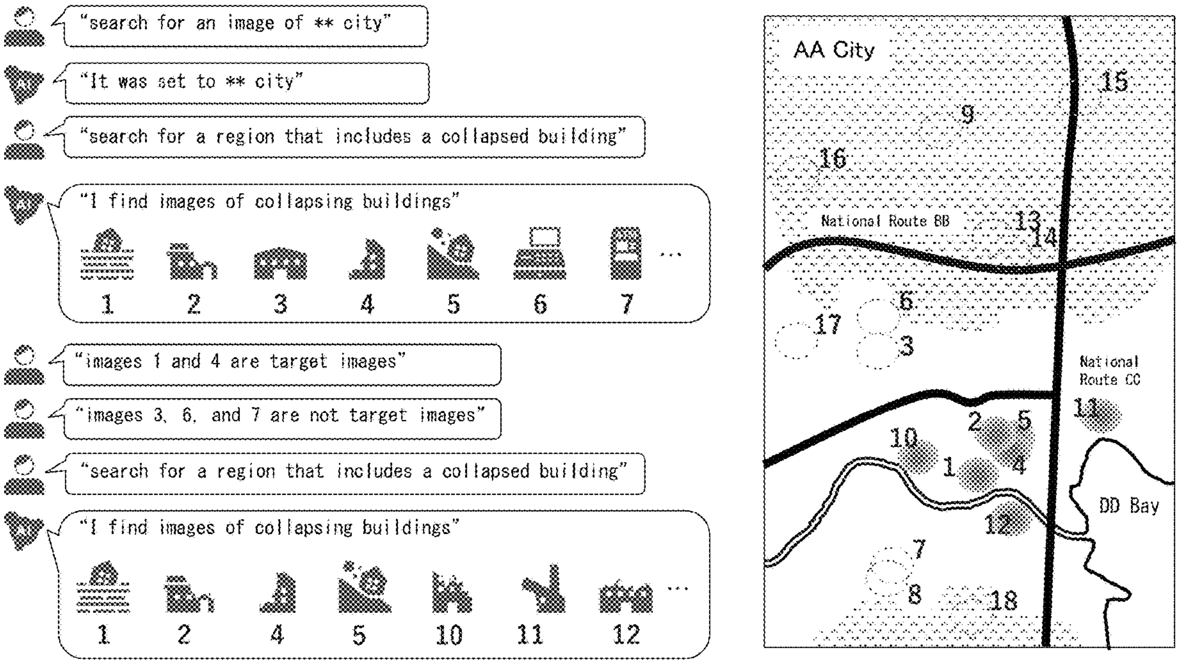
FIG. 7 is a diagram illustrating an example of a screen displayed by the information display apparatus.
Figure 8:
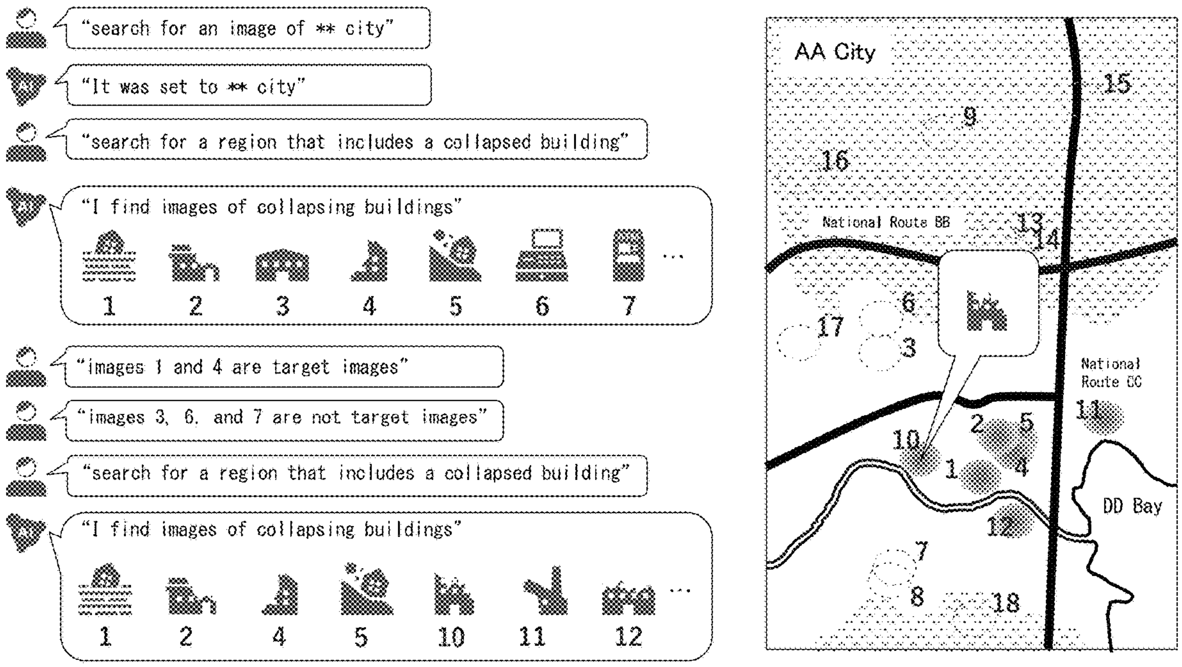
FIG. 8 is a diagram illustrating an example of a screen displayed by the information display apparatus.
Figure 9:
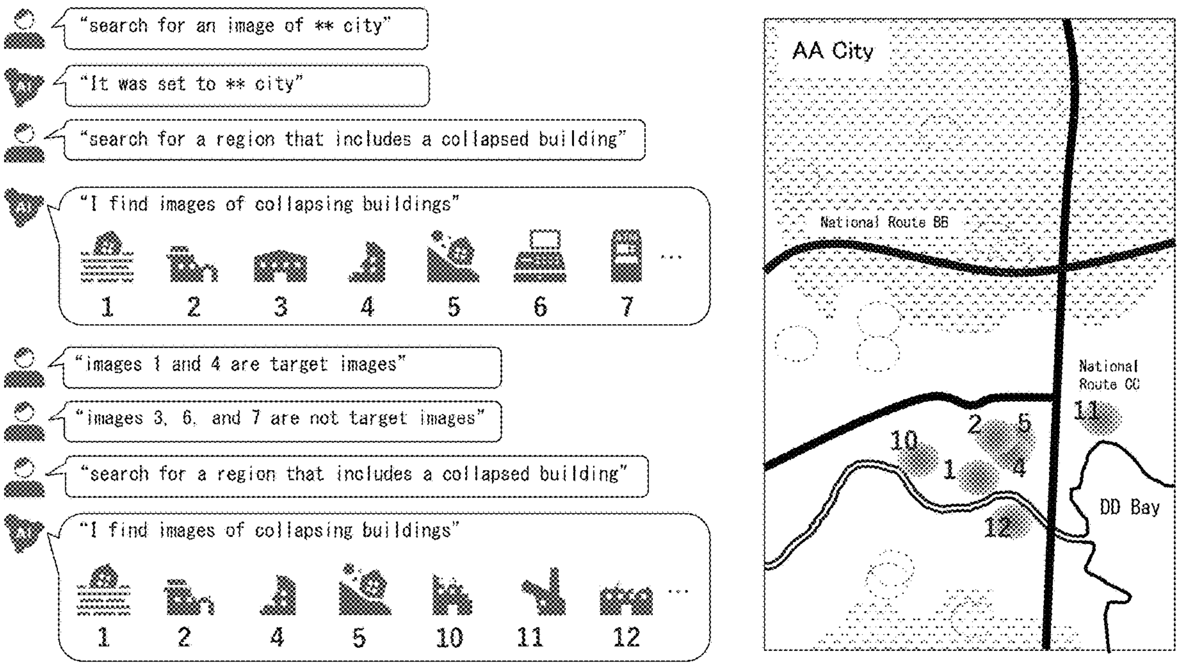
FIG. 9 is a diagram illustrating an example of a screen displayed by the information display apparatus.

Furthermore, assume that, for example, as shown in FIGS. 7 to 9, the selection updating unit 204 is searching for a collapsed building in images selected by the image selection unit 201 from among the group of images obtained by the image obtaining unit 101 in advance. In this case, the display unit 301 displays a group of images in which positions have been specified by the collation unit 202, from among the searched images. In addition, the display unit 301 can also display a map on which the numbers of the images are superimposed in the vicinities of positions specified on the map, and an intensity map is superimposed.

The display unit 301 can also display an image that includes the situation of an object and information by which the position of the object in a region can be specified. The display unit 301 can also create information that includes the position of an object in a reference image and the situation of the object in a target image, which are associated with each other, and display the created information.

Examples of "information by which the position of the object can be specified" that has been mentioned above include information indicating a mode in which the situation of the object and the position of the object are connected by a line, and information indicating a mode in which the situation of the object and the position of the object are given the same reference sign.

The display unit 301 can also display a map of a region instead of a reference image obtained by capturing an image of the region. In addition, the display unit 301 can also display a reference image and an image showing a map. Furthermore, the display unit 301 can create information that includes the situation of an object in each of a plurality of target images, and information that by which the position of the object in the reference image can be specified, and display these pieces of information on one screen.

In addition, when target images show the situations of objects after a disaster, the display unit 301 can also calculate a ratio of the number of objects in a reference image to the number of objects in the target images, and display the calculated ratio. Furthermore, the display unit 301 can also display the number of objects in the target images. Such display processing can also be referred to as processing for displaying disaster situations in a region included in the reference image.

Note that, in the example embodiment, information displayed on the display unit 301 is not limited to the aforementioned information. In the example embodiment, the display unit 301 can also display the history of the user up to this point, and the like in more detail, for example.

[Apparatus Operations]

Figure 10:
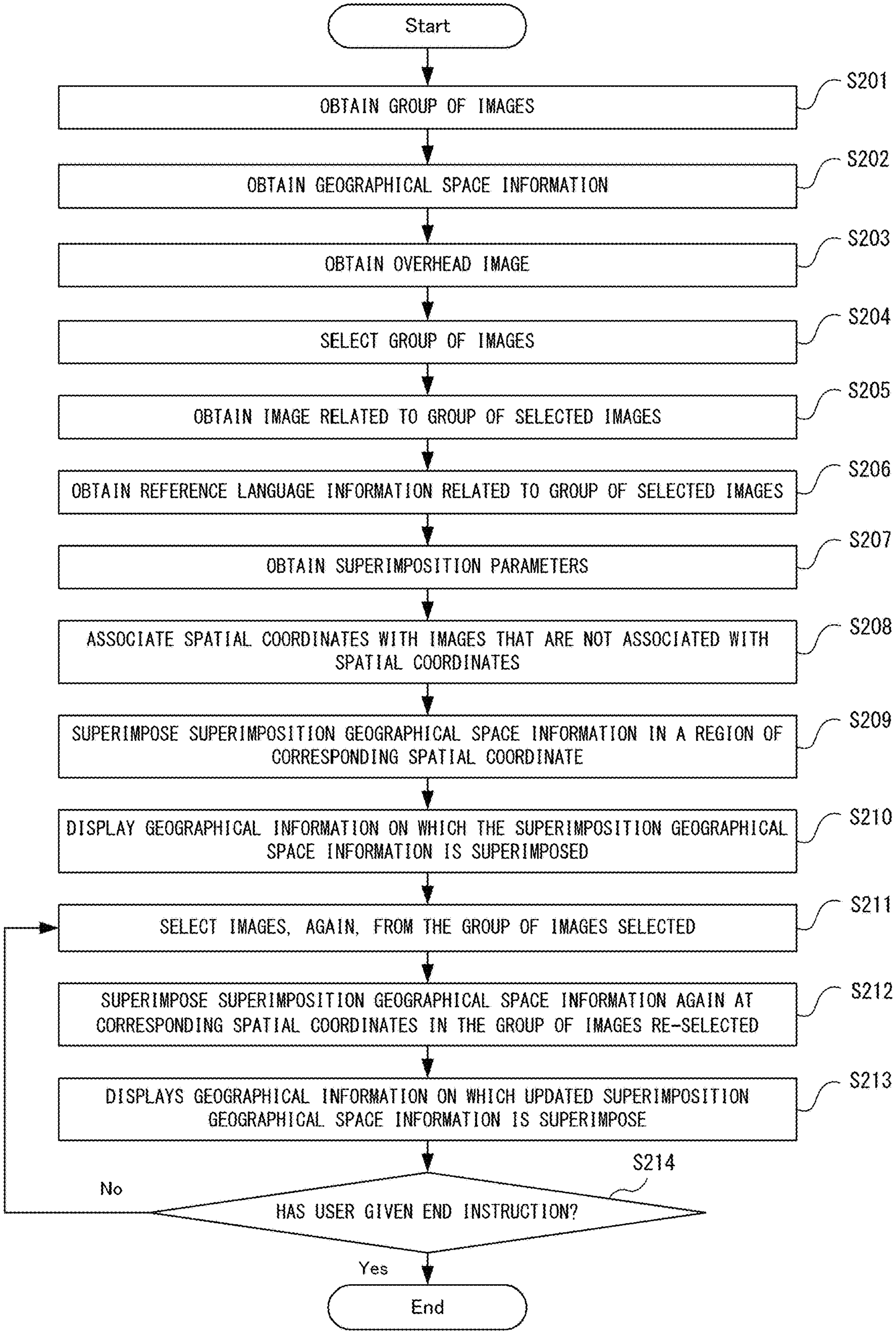
FIG. 10 is a flowchart illustrating exemplary operations of the information display apparatus.

Next, operations of the information display apparatus 100 will be described with reference to FIG. 10. FIG. 10 is a flowchart illustrating exemplary operations of the information display apparatus. In the following description, FIGS. 1 to 9 will be referenced as appropriate. In 10) addition, in the first example embodiment, an information display method is performed by causing the information display apparatus 100 to operate. Thus, in the example embodiment, a description of the information display method is replaced with the following description of operations of the information display apparatus.

As shown in FIG. 10, first, the image obtaining unit 101 obtains a group of images (step S201). Next, the geographical information obtaining unit 102 obtains geographical space information (step S202). Next, the overhead image obtaining unit 103 obtains an overhead image such as an aerial photograph or a satellite image (step S203). Note that these images and the like may be obtained from a server apparatus, a terminal apparatus, and the like connected to the information display apparatus 100 via a network or the like.

Next, the image selection unit 201 selects a group of images from the group of images obtained in step S201, in accordance with an instruction from the user (step S204). Next, the reference image obtaining unit 104 obtains an image related to the group of selected images (step S205). Next, the language obtaining unit 105 obtains reference language information related to the group of selected images (step S206). Next, the superimposition parameter obtaining unit 106 obtains superimposition parameters required for superimposition (step S207).

Next, the collation unit 202 associates spatial coordinates with images that are not associated with spatial coordinates from among the group of images selected in step S204 (step S208). Next, the information superimposition unit 203 superimposes superimposition geographical space information displayed in an emphasized manner or the like, in a region of corresponding spatial coordinates (step S209). Next, the display unit 301 displays geographical information on which the superimposition geographical space information is superimposed (step S210).

Next, the selection updating unit 204 selects images, again, from the group of images selected in step S204 (step S211). Next, the superimposition updating unit 205 superimposes the superimposition geographical space information again at corresponding spatial coordinates in the group of images re-selected in step S211, thereby performing update (step S212).

Next, the display unit 301 displays, on a screen of the display device 200, geographical information on which the lastly updated superimposition geographical space information is superimposed, that is to say, re-superimposition geographical space information (step S213).

The selection updating unit 204 then determines whether or not the user has given an instruction to end the processing (step S214). As a result of determination in step S214, if the user has not given an instruction to end the processing, the selection updating unit 204 executes step S211 again. On the other hand, as a result of determination in step S214, if the user has given an instruction to end the processing, the processing of the information display apparatus 100 ends.

Specific Examples

Specific examples of operations of the information display apparatus will be described below in detail with reference to FIGS. 3 to 9.

As shown in FIG. 3, for example, when the user first inputs a message "search for an image of  city" to the information display apparatus 100 via a terminal apparatus or the like of the user, the language obtaining unit 105** obtains the input content as reference language information.

As a result, the image selection unit 201 selects images associated with  city from a group of images obtained by the image obtaining unit 101 in advance. Furthermore, the collation unit 202** specifies positions in the selected images.

The display unit 301 then superimposes the language obtained by the language obtaining unit 105 and a response to it on the selected images, and further superimposes the numbers of the images in the vicinities of the positions specified on a map. In addition, the display unit 301 also superimposes an intensity map on the selected images.

Next, assume that, as shown in FIG. 4, the user inputs a message "search for a region that includes a collapsed building" to the information display apparatus 100 via a terminal apparatus or the like of the user.

In this case, the selection updating unit 204 searches for images that include a collapsed building from the group of images selected by the image selection unit 201 from the group of images obtained by the image obtaining unit 101 in advance, and newly selects the retrieved images. Furthermore, the collation unit 202 specifies the positions in the newly selected images.

The display unit 301 then superimposes the language obtained by the language obtaining unit 105 and a response to it on the newly selected images, and further superimposes the numbers of the images and intensities in the vicinities of the positions specified on a map. Note that, at this time, there may be cases where some images are different from what is intended by the user. There is no need to display the image number of an image that has not been selected by the selection updating unit 204.

Figure 6:
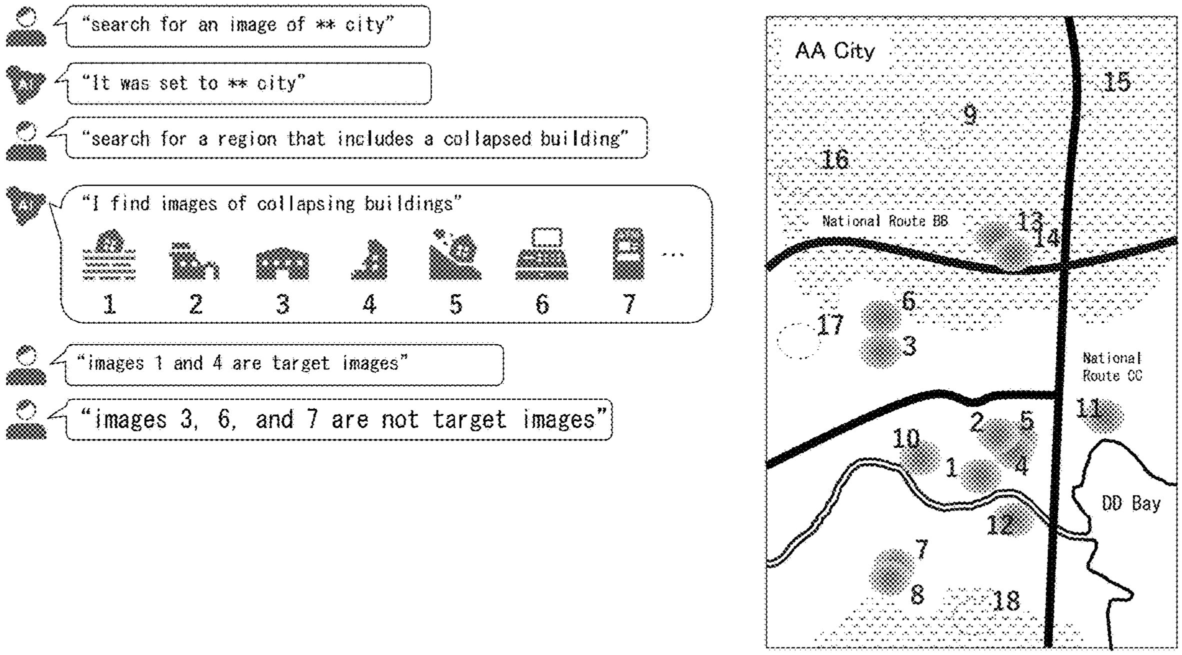
FIG. 6 is a diagram illustrating an example of a screen displayed by the information display apparatus.

Furthermore, assume that, as shown in FIG. 6, the user inputs "images 1 and 4 are target images" and "images 3, 6, and 7 are not target images" via a terminal apparatus or the like. In this case, as shown in FIGS. 7 to 9, the selection updating unit 204 performs search in the group of images selected by the image selection unit 201 from the group of images obtained by the image obtaining unit 101 in advance, using images that resemble or images that do not resemble these designated images. Furthermore, the collation unit 202 specifies the positions in the retrieved images.

The display unit 301 then superimposes, on the retrieved images, the language obtained by the language obtaining unit 105 and a response to it, and further superimposes the numbers of the images and intensities in the vicinities of the positions specified on a map. Note that, at this time, there may be cases where some images are different from what is intended by the user.

Furthermore, by the user performing a designation operation (for example, hovering a mouse cursor), the display unit 301 can also re-display a specific image on the map. Note that there is no need to display the image number of an image that has not been selected by the selection updating unit 204.

Effects of Example Embodiment

As described above, in the first example embodiment, the information display apparatus 100 can display, on an image, information by which the situation and the position of an object in a disaster-struck region can be specified. For this reason, the information display apparatus 100 makes it possible to quickly ascertain and specify a disaster situation.

[Program]

The program may be any program for causing a computer to execute steps S201 to S214 illustrating in FIG. 10. By installing this program in a computer and executing the program, it is possible to realize the information display apparatus 100 and the information display method according to the present example embodiment. In this case, the processor of the computer 30) functions as the image obtaining unit 101, the geographical information obtaining unit 102, the overhead image obtaining unit 103, the reference image obtaining unit 104, the language obtaining unit 105, the superimposition parameter obtaining unit 106, the image selection unit 201, the collation unit 202, the information superimposition unit 203, the selection updating unit 204, the superimposition updating unit 205, and the display unit 301. The computer may be a general-purpose PC, a server computer, a smartphone, or a tablet terminal device.

In addition, the program embodiment may be executed by a computer system constituted by a plurality of computers. In this case, for example, each computer may function as one of the image obtaining unit 101, the geographical information obtaining unit 102, the overhead image obtaining unit 103, the reference image obtaining unit 104, the language obtaining unit 105, the superimposition parameter obtaining unit 106, the image selection unit 201, the collation unit 202, the information superimposition unit 203, the selection updating unit 204, the superimposition updating unit 205, and the display unit 301.

[Physical Configuration]

Figure 11:
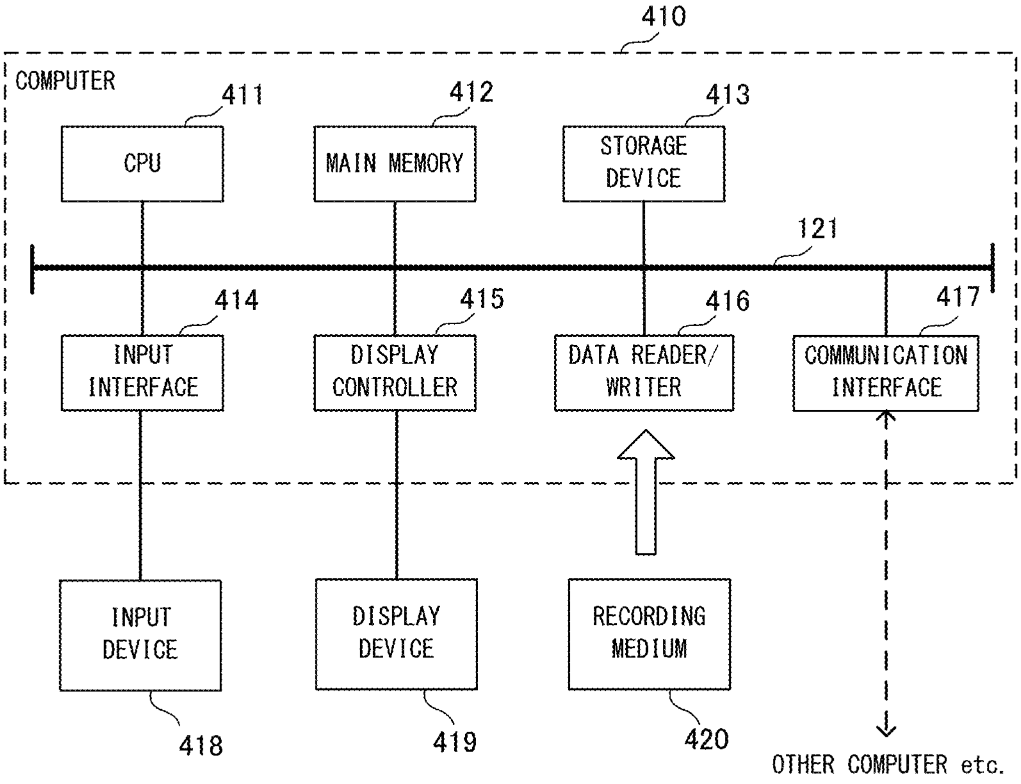
FIG. 11 is a block diagram illustrating an example of a computer that realizes the information display apparatus.

Here, a computer that realizes the information display apparatus 100 by executing the program according to the present example embodiment will be described with reference to FIG. 11. FIG. 11 is a block diagram illustrating an example of a computer that realizes the information display apparatus.

As illustrated in FIG. 11, a computer 410 includes a CPU 411, a main memory 412, a storage device 413, an input interface 414, a display controller 415, a data reader/writer 416, and a communication interface 417. These units are connected via a bus 421 so as to be able to perform data communication with each other.

the computer 410 may include a GPU (Graphics Processing Unit) or a FPGA (Field-Programmable Gate Array) in addition to the CPU 411 or instead of the CPU 411. In this case, the GPU or the FPGA may execute the program.

The CPU 411 loads programs (codes) according to the present example embodiment stored in the storage device 413 to the main memory 412, and executes the programs in a predetermined order to perform various kinds of calculations. The main memory 412 is typically a volatile storage device such as a DRAM (Dynamic Random Access Memory).

Also, the program according to the present example embodiment is provided in the state of being stored in a computer-readable recording medium 420. Note that programs according to the present example embodiment may be distributed on the Internet that is connected via the communication interface 417.

Specific examples of the storage device 413 include a hard disk drive, and a semiconductor storage device such as a flash memory. The input interface 414 mediates data transmission between the CPU 411 and an input device 418 such as a keyboard or a mouse. The display controller 415 is connected to a display device 419 and controls the display of the display device 419.

The data reader/writer 416 mediates data transmission between the CPU 411 and the recording medium 420, reads out programs from the recording medium 420, and writes the results of processing performed by the computer 410 to the recording medium 420. The communication interface 417 mediates data transmission between the CPU 411 and another computer.

Specific examples of the recording medium 420 include general-purpose semiconductor storage devices such as a CF (Compact Flash (registered trademark)) and a SD (Secure Digital), a magnetic recording medium such as a flexible disk, and an optical recording medium such as a CD-ROM (Compact Disk Read Only Memory).

Note that the information display apparatus 100 can also be realized by using hardware (for example, circuits) corresponding to the units, in place of a computer that has programs 10) installed therein. Furthermore, a configuration may also be adopted in which a portion of the information display apparatus 100 is realized by programs, and the remaining portion of the information display apparatus 100 is realized by hardware.

One or all of the above-described example embodiments can be expressed as, but are not limited to, Supplementary Note 1 to Supplementary Note 18 described below.

Supplementary Note 1

An information display apparatus comprising:

a collation unit configured to specify a position of an object in an overhead image obtained by capturing an image of a region that includes the object before a disaster, based on a result of collating the overhead image with a section in a target image that includes a situation of the object after the disaster, the section satisfying a criterion for determining that an influence of the disaster is small; and a display unit configured to display an image that includes the situation of the object and information by which the position of the object in the overhead image can be specified.

Supplementary Note 2

The information display apparatus according to supplementary note 1, further comprising:

an image obtaining unit configured to obtain one or more images as a group of images;

a geographical information obtaining unit configured to obtain geographical information to be superimposed on a two-dimensional plane or three-dimensional space, as geographical space information;

an overhead image obtaining unit configured to obtain at least one image obtained by capturing an image of a target region from above, as an overhead image; and an image selection unit configured to select one or more images from the group of obtained images, as a group of selected images, based on at least one of a reference image and reference language information, wherein the collation unit collates the at least one target image out of the group of obtained images with the geographical space information and the overhead image, calculates a correspondence relationship between spatial positions in the geographical space information and the group of images based on a collation result, and outputs corresponding spatial coordinates as correspondence spatial coordinates.

Supplementary Note 3

The information display apparatus according to supplementary note 2, further comprising:

an information superimposition unit configured to perform superimposition display of the geographical space information on a portion of each image of the group of selected images, the portion corresponding to the correspondence spatial coordinates, and output the image subjected to superimposition display as superimposition geographical space information;

a selection updating unit configured to further re-select images from the group of selected images based on at least one of a reference image and reference language information, and output the re-selected images as a group of re-selected images; and a superimposition updating unit configured to perform superimposition display of the superimposition geographical space information again, on each image of the group of re-selected images that has been output, perform different re-superimposition display on an image that has not been selected as the group of re-selected images, and output these re-superimposition results as re-superimposition geographical space information, wherein the display unit displays the superimposition geographical space information or the re-superimposition geographical space information.

Supplementary Note 4

The information display apparatus according to supplementary note 3, further comprising:

a reference image obtaining unit configured to obtain one or more images that are each used as the reference image, as a group of reference images;

a language obtaining unit configured to obtain a language to be used as the reference language information; and a superimposition parameter obtaining unit configured to obtain at least one of an intensity, an attribute, an area, and characters for performing superimposition, as a parameter required for performing the superimposition display on each image of the group of obtained images, namely a superimposition parameter, wherein the image selection unit selects one or more images from the group of obtained images based on at least one of the reference language information and the group of reference images, and outputs the selected images as a group of selected images, the collation unit collates one or more images that belong to the group of selected images with the geographical space information and the overhead image, calculates a correspondence relationship between spatial positions in the geographical space information and the one or more images that belong to the group of selected images based on a collation result, and outputs corresponding spatial coordinates as correspondence spatial coordinates, the information superimposition unit performs superimposition display using the superimposition parameter in addition to the geographical space information, and the superimposition updating unit performs re-superimposition display using the superimposition parameter in addition to the superimposition geographical space information.

Supplementary Note 5

The information display apparatus according to supplementary note 4, wherein the display unit further displays at least one of images in the group of images, the geographical space information, the overhead image, an image in the group of reference images, and the reference language information.

Supplementary Note 6

The information display apparatus according to supplementary note 4, wherein the information superimposition unit generates a pattern indicating an intensity and an area of superimposition based on the superimposition parameters, superimposes the generated pattern on the geographical space information, and further superimposes an attribute and characters on the geographical space information based on the superimposition parameters, and the superimposition updating unit generates a pattern that indicates an intensity and an area of superimposition based on the superimposition parameters, superimposes the generated pattern on the geographical space information, and further superimposes an attribute and characters on the geographical space information based on the superimposition parameters.

Supplementary Note 7

An information display method comprising:

a collation step of specifying a position of an object in an overhead image obtained by capturing an image of a region that includes the object before a disaster, based on a result of collating the overhead image with a section in a target image that includes a situation of the object after the disaster, the section satisfying a criterion for determining that an influence of the disaster is small; and a display step of displaying an image that includes the situation of the object and information by which the position of the object in the overhead image can be specified.

Supplementary Note 8

The information display method according to supplementary note 7, further comprising:

an image obtaining step of obtaining one or more images as a group of images;

a geographical information step of obtaining geographical information to be superimposed on a two-dimensional plane or three-dimensional space, as geographical space information;

an overhead image obtaining step of obtaining at least one image obtained by capturing an image of a target region from above, as an overhead image; and an image selection step of selecting one or more images from the group of obtained images, as a group of selected images, based on at least one of a reference image and reference language information, wherein in the collation step, collating the at least one target image out of the group of obtained images with the geographical space information and the overhead image, calculating a correspondence relationship between spatial positions in the geographical space information and the group of images based on a collation result, and outputting corresponding spatial coordinates as correspondence spatial coordinates.

Supplementary Note 9

The information display method according to supplementary note 8, further comprising:

an information superimposition step of performing superimposition display of the geographical space information on a portion of each image of the group of selected images, the portion corresponding to the correspondence spatial coordinates, and outputting the image subjected to superimposition display as superimposition geographical space information;

a selection updating step of further re-selecting images from the group of selected images based on at least one of a reference image and reference language information, and outputting the re-selected images as a group of re-selected images; and a superimposition updating step of performing superimposition display of the superimposition geographical space information again, on each image of the group of re-selected images that has been output, performing different re-superimposition display on an image that has not been selected as the group of re-selected images, and outputting these re-superimposition results as re-superimposition geographical space information, wherein, in the display step, displaying the superimposition geographical space information or the re-superimposition geographical space information.

Supplementary Note 10

The information display method according to supplementary note 9, further comprising:

a reference image obtaining step of obtaining one or more images that are each used as the reference image, as a group of reference images;

a language obtaining step of obtaining a language to be used as the reference language information; and a superimposition parameter obtaining step of obtaining at least one of an intensity, an attribute, an area, and characters for performing superimposition, as a parameter required for performing the superimposition display on each image of the group of obtained images, namely a superimposition parameter, wherein, in the image selection step, selecting one or more images from the group of obtained images based on at least one of the reference language information and the group of reference images, and outputting the selected images as a group of selected images, in the collation step, collating one or more images that belong to the group of selected images with the geographical space information and the overhead image, calculating a correspondence relationship between spatial positions in the geographical space information and the one or more images that belong to the group of selected images based on a collation result, and outputting corresponding spatial coordinates as correspondence spatial coordinates, in the information superimposition step, performing superimposition display using the superimposition parameter in addition to the geographical space information, and in the superimposition updating step, performing re-superimposition display using the superimposition parameter in addition to the superimposition geographical space information.

Supplementary Note 11

The information display method according to supplementary note 10, wherein, in the display step, further displaying at least one of images in the group of images, the geographical space information, the overhead image, an image in the group of reference images, and the reference language information.

Supplementary Note 12

The information display method according to supplementary note 10, wherein, in the information superimposition step, generating a pattern indicating an intensity and an area of superimposition based on the superimposition parameters, superimposes the generated pattern on the geographical space information, and further superimposing an attribute and characters on the geographical space information based on the superimposition parameters, and in the superimposition updating step, generating a pattern that indicates an intensity and an area of superimposition based on the superimposition parameters, superimposing the generated pattern on the geographical space information, and further superimposing an attribute and characters on the geographical space information based on the superimposition parameters.

Supplementary Note 13

A non-transitory computer-readable recording medium that includes a program recording thereon, the program including instructions that cause a computer to carry out:

a collation step of specifying a position of an object in an overhead image obtained by capturing an image of a region that includes the object before a disaster, based on a result of collating the overhead image with a section in a target image that includes a situation of the object after the disaster, the section satisfying a criterion for determining that an influence of the disaster is small; and a display step of displaying an image that includes the situation of the object and information by which the position of the object in the overhead image can be specified.

Supplementary Note 14

The non-transitory computer-readable recording medium according to supplementary note 13, further the program including instructions that cause the computer to carry out:

an image obtaining step of obtaining one or more images as a group of images;

a geographical information step of obtaining geographical information to be superimposed on a two-dimensional plane or three-dimensional space, as geographical space information;

an overhead image obtaining step of obtaining at least one image obtained by capturing an image of a target region from above, as an overhead image; and an image selection step of selecting one or more images from the group of obtained images, as a group of selected images, based on at least one of a reference image and reference language information, wherein in the collation step, collating the at least one target image out of the group of obtained images with the geographical space information and the overhead image, calculating a correspondence relationship between spatial positions in the geographical space information and the group of images based on a collation result, and outputting corresponding spatial coordinates as correspondence spatial coordinates.

Supplementary Note 15

The non-transitory computer-readable recording medium according to supplementary note 14, further the program including instructions that cause the computer to carry out:

an information superimposition step of performing superimposition display of the geographical space information on a portion of each image of the group of selected images, the portion corresponding to the correspondence spatial coordinates, and outputting the image subjected to superimposition display as superimposition geographical space information;

a selection updating step of further re-selecting images from the group of selected images based on at least one of a reference image and reference language information, and outputting the re-selected images as a group of re-selected images; and a superimposition updating step of performing superimposition display of the superimposition geographical space information again, on each image of the group of re-selected images that has been output, performing different re-superimposition display on an image that has not been selected as the group of re-selected images, and outputting these re-superimposition results as re-superimposition geographical space information, wherein, in the display step, displaying the superimposition geographical space information or the re-superimposition geographical space information.

Supplementary Note 16

The non-transitory computer-readable recording medium according to supplementary note 15, further the program including instructions that cause the computer to carry out:

a reference image obtaining step of obtaining one or more images that are each used as the reference image, as a group of reference images;

a language obtaining step of obtaining a language to be used as the reference language information; and a superimposition parameter obtaining step of obtaining at least one of an intensity, an attribute, an area, and characters for performing superimposition, as a parameter required for performing the superimposition display on each image of the group of obtained images, namely a superimposition parameter, wherein, in the image selection step, selecting one or more images from the group of obtained images based on at least one of the reference language information and the group of reference images, and outputting the selected images as a group of selected images, in the collation step, collating one or more images that belong to the group of selected images with the geographical space information and the overhead image, calculating a correspondence relationship between spatial positions in the geographical space information and the one or more images that belong to the group of selected images based on a collation result, and outputting corresponding spatial coordinates as correspondence spatial coordinates, in the information superimposition step, performing superimposition display using the superimposition parameter in addition to the geographical space information, and in the superimposition updating step, performing re-superimposition display using the superimposition parameter in addition to the superimposition geographical space information.

Supplementary Note 17

The non-transitory computer-readable recording medium according to supplementary note 16, wherein, in the display step, further displaying at least one of images in the group of images, the geographical space information, the overhead image, an image in the group of reference images, and the reference language information.

Supplementary Note 18

The non-transitory computer-readable recording medium according to supplementary note 17, wherein, in the information superimposition step, generating a pattern indicating an intensity and an area of superimposition based on the superimposition parameters, superimposes the generated pattern on the geographical space information, and further superimposing an attribute and characters on the geographical space information based on the superimposition parameters, and in the superimposition updating step, generating a pattern that indicates an intensity and an area of superimposition based on the superimposition parameters, superimposing the generated pattern on the geographical space information, and further superimposing an attribute and characters on the geographical space information based on the superimposition parameters.

Although the invention of the present application has been described above with reference to the example embodiment, the invention of the present application is not limited to the above-described example embodiment. Various changes that can be understood by a person skilled in the art within the scope of the invention of the present application can be made to the configuration and the details of the invention of the present application.

INDUSTRIAL APPLICABILITY

The present disclosure is useful for a system that displays information showing a disaster situation or the like.

REFERENCE SIGNS LIST

100 Information display apparatus
101 Image obtaining unit
102 Geographical information obtaining unit
103 Overhead image obtaining unit
104 Reference image obtaining unit
105 Language obtaining unit
106 Superimposition parameter obtaining unit
200 Display device
201 Image selection unit
202 Collation unit
203 Information superimposition unit
204 Selection updating unit
205 Superimposition updating unit
301 Display unit
410 Computer
411 CPU
412 Main memory
413 Storage device
414 Input interface
415 Display controller
416 Data reader/writer
417 Communication interface
418 Input device
419 Display device
420 Recording medium
421 Bus

What is claimed is:

1. An information display apparatus comprising:

at least one memory storing instructions; and at least one processor configured to execute the instructions to:

specify a position of an object in an overhead image obtained by capturing an image of a region that includes the object before a disaster, based on a result of collating the overhead image with a section in a target image that includes a situation of the object after the disaster, the section satisfying a criterion for determining that an influence of the disaster on a manmade object or a natural object; and display an image that includes the situation of the object and information by which the position of the object in the overhead image can be specified.

2. The information display apparatus according to claim 1, wherein the processor further:

obtains one or more images as a group of images;

obtains geographical information to be superimposed on a two-dimensional plane or three-dimensional space, as geographical space information;

obtains at least one image obtained by capturing an image of a target region from above, as an overhead image; and selects one or more images from the group of obtained images, as a group of selected images, based on at least one of a reference image and reference language information, collates the at least one target image out of the group of obtained images with the geographical space information and the overhead image, calculates a correspondence relationship between spatial positions in the geographical space information and the group of images based on a collation result, and outputs corresponding spatial coordinates as correspondence spatial coordinates.

3. The information display apparatus according to claim 2, wherein the processor further:

performs superimposition display of the geographical space information on a portion of each image of the group of selected images, the portion corresponding to the correspondence spatial coordinates, and outputs the image subjected to superimposition display as superimposition geographical space information;

re-selects images from the group of selected images based on at least one of a reference image and reference language information, and outputting the re-selected images as a group of re-selected images; and performs superimposition display of the superimposition geographical space information again, on each image of the group of re-selected images that has been output, performing different re-superimposition display on an image that has not been selected as the group of re-selected images, and outputting these re-superimposition results as re-superimposition geographical space information, displays the superimposition geographical space information or the re-superimposition geographical space information.

4. The information display apparatus according to claim 3, wherein the processor further:

obtains one or more images that are each used as the reference image, as a group of reference images;

obtains a language to be used as the reference language information; and obtains at least one of an intensity, an attribute, an area, and characters for performing superimposition, as a parameter required for performing the superimposition display on each image of the group of obtained images, namely a superimposition parameter, selects one or more images from the group of obtained images based on at least one of the reference language information and the group of reference images, and outputs the selected images as a group of selected images, collates one or more images that belong to the group of selected images with the geographical space information and the overhead image, calculates a correspondence relationship between spatial positions in the geographical space information and the one or more images that belong to the group of selected images based on a collation result, and outputs corresponding spatial coordinates as correspondence spatial coordinates, performs superimposition display using the superimposition parameter in addition to the geographical space information, and performs re-superimposition display using the superimposition parameter in addition to the superimposition geographical space information.

5. The information display apparatus according to claim 4, wherein the processor further:

displays at least one of images in the group of images, the geographical space information, the overhead image, an image in the group of reference images, and the reference language information.

6. The information display apparatus according to claim 4, wherein the processor further:

generates a pattern indicating an intensity and an area of superimposition based on the superimposition parameters, superimposes the generated pattern on the geographical space information, and further superimposes an attribute and characters on the geographical space information based on the superimposition parameters, and generates a pattern that indicates an intensity and an area of superimposition based on the superimposition parameters, superimposes the generated pattern on the geographical space information, and further superimposes an attribute and characters on the geographical space information based on the superimposition parameters.

7. An information display method comprising:

specifying a position of an object in an overhead image obtained by capturing an image of a region that includes the object before a disaster, based on a result of collating the overhead image with a section in a target image that includes a situation of the object after the disaster, the section satisfying a criterion for determining that an influence of the disaster on a manmade object or a natural object; and displaying an image that includes the situation of the object and information by which the position of the object in the overhead image can be specified.

8. The information display method according to claim 7, further comprising:

obtaining one or more images as a group of images;

obtaining geographical information to be superimposed on a two-dimensional plane or three-dimensional space, as geographical space information;

obtaining at least one image obtained by capturing an image of a target region from above, as an overhead image; and selecting one or more images from the group of obtained images, as a group of selected images, based on at least one of a reference image and reference language information, wherein in the collating, collating the at least one target image out of the group of obtained images with the geographical space information and the overhead image, calculating a correspondence relationship between spatial positions in the geographical space information and the group of images based on a collation result, and outputting corresponding spatial coordinates as correspondence spatial coordinates.

9. The information display method according to claim 8, further comprising:

performing superimposition display of the geographical space information on a portion of each image of the group of selected images, the portion corresponding to the correspondence spatial coordinates, and outputting the image subjected to superimposition display as superimposition geographical space information;

further re-selecting images from the group of selected images based on at least one of a reference image and reference language information, and outputting the re-selected images as a group of re-selected images; and performing superimposition display of the superimposition geographical space information again, on each image of the group of re-selected images that has been output, performing different re-superimposition display on an image that has not been selected as the group of re-selected images, and outputting these re-superimposition results as re-superimposition geographical space information, wherein, in the displaying, displaying the superimposition geographical space information or the re-superimposition geographical space information.

10. The information display method according to claim 9, further comprising:

obtaining one or more images that are each used as the reference image, as a group of reference images;

obtaining a language to be used as the reference language information; and obtaining at least one of an intensity, an attribute, an area, and characters for performing superimposition, as a parameter required for performing the superimposition display on each image of the group of obtained images, namely a superimposition parameter, wherein, in the image selecting, selecting one or more images from the group of obtained images based on at least one of the reference language information and the group of reference images, and outputting the selected images as a group of selected images, in the collating, collating one or more images that belong to the group of selected images with the geographical space information and the overhead image, calculating a correspondence relationship between spatial positions in the geographical space information and the one or more images that belong to the group of selected images based on a collation result, and outputting corresponding spatial coordinates as correspondence spatial coordinates, in the information superimposing, performing superimposition display using the superimposition parameter in addition to the geographical space information, and in the superimposition updating, performing re-superimposition display using the superimposition parameter in addition to the superimposition geographical space information.

11. The information display method according to claim 10, wherein, in the displaying further displaying at least one of images in the group of images, the geographical space information, the overhead image, an image in the group of reference images, and the reference language information.

12. The information display method according to claim 10, wherein, in the information superimposing, generating a pattern indicating an intensity and an area of superimposition based on the superimposition parameters, superimposes the generated pattern on the geographical space information, and further superimposing an attribute and characters on the geographical space information based on the superimposition parameters, and in the superimposition updating, generating a pattern that indicates an intensity and an area of superimposition based on the superimposition parameters, superimposing the generated pattern on the geographical space information, and further superimposing an attribute and characters on the geographical space information based on the superimposition parameters.

13. A non-transitory computer-readable recording medium that includes a program recording thereon, the program including instructions that cause a computer to carry out the steps of:

specifying a position of an object in an overhead image obtained by capturing an image of a region that includes the object before a disaster, based on a result of collating the overhead image with a section in a target image that includes a situation of the object after the disaster, the section satisfying a criterion for determining that an influence of the disaster on a manmade object or a natural object; and displaying an image that includes the situation of the object and information by which the position of the object in the overhead image can be specified.

14. The non-transitory computer-readable recording medium according to claim 13, further the program including instructions that cause the computer to carry out the steps of:

obtaining one or more images as a group of images;

obtaining geographical information to be superimposed on a two-dimensional plane or three-dimensional space, as geographical space information;

obtaining at least one image obtained by capturing an image of a target region from above, as an overhead image; and selecting one or more images from the group of obtained images, as a group of selected images, based on at least one of a reference image and reference language information, wherein in the collating, collating the at least one target image out of the group of obtained images with the geographical space information and the overhead image, calculating a correspondence relationship between spatial positions in the geographical space information and the group of images based on a collation result, and outputting corresponding spatial coordinates as correspondence spatial coordinates.

15. The non-transitory computer-readable recording medium according to claim 14, further the program including instructions that cause the computer to carry out the steps of:

performing superimposition display of the geographical space information on a portion of each image of the group of selected images, the portion corresponding to the correspondence spatial coordinates, and outputting the image subjected to superimposition display as superimposition geographical space information;

further re-selecting images from the group of selected images based on at least one of a reference image and reference language information, and outputting the re-selected images as a group of re-selected images; and performing superimposition display of the superimposition geographical space information again, on each image of the group of re-selected images that has been output, performing different re-superimposition display on an image that has not been selected as the group of re-selected images, and outputting these re-superimposition results as re-superimposition geographical space information, wherein, in the displaying, displaying the superimposition geographical space information or the re-superimposition geographical space information.

16. The non-transitory computer-readable recording medium according to claim 15, further the program including instructions that cause the computer to carry out the steps of:

obtaining one or more images that are each used as the reference image, as a group of reference images;

obtaining a language to be used as the reference language information; and obtaining at least one of an intensity, an attribute, an area, and characters for performing superimposition, as a parameter required for performing the superimposition display on each image of the group of obtained images, namely a superimposition parameter, wherein, in the image selecting, selecting one or more images from the group of obtained images based on at least one of the reference language information and the group of reference images, and outputting the selected images as a group of selected images, in the collating, collating one or more images that belong to the group of selected images with the geographical space information and the overhead image, calculating a correspondence relationship between spatial positions in the geographical space information and the one or more images that belong to the group of selected images based on a collation result, and outputting corresponding spatial coordinates as correspondence spatial coordinates, in the information superimposing, performing superimposition display using the superimposition parameter in addition to the geographical space information, and in the superimposition updating, performing re-superimposition display using the superimposition parameter in addition to the superimposition geographical space information.

17. The non-transitory computer-readable recording medium according to claim 16, wherein, in the displaying, further displaying at least one of images in the group of images, the geographical space information, the overhead image, an image in the group of reference images, and the reference language information.

18. The non-transitory computer-readable recording medium according to claim 17, wherein, in the information superimposing, generating a pattern indicating an intensity and an area of superimposition based on the superimposition parameters, superimposes the generated pattern on the geographical space information, and further superimposing an attribute and characters on the geographical space information based on the superimposition parameters, and in the superimposition updating, generating a pattern that indicates an intensity and an area of superimposition based on the superimposition parameters, superimposing the generated pattern on the geographical space information, and further superimposing an attribute and characters on the geographical space information based on the superimposition parameters.

* * * * *